(12) United States Patent
Whatmough et al.

(10) Patent No.: US 11,640,533 B2
(45) Date of Patent: May 2, 2023

(54) SYSTEM, METHOD AND APPARATUS FOR TRAINING NEURAL NETWORKS USING MULTIPLE DATASETS

(71) Applicant: Arm Limited, Cambridge (GB)

(72) Inventors: Paul Nicholas Whatmough, Cambridge, MA (US); Matthew Mattina, Boylston, MA (US); Jesse Garrett Beu, Austin, TX (US)

(73) Assignee: Arm Limited, Cambridge (GB)

( * ) Notice: Subject to any disclaimer, the term of this patent is extended or adjusted under 35 U.S.C. 154(b) by 747 days.

(21) Appl. No.: 16/054,358

(22) Filed: Aug. 3, 2018

(65) Prior Publication Data

US 2020/0042877 A1  Feb. 6, 2020

(51) Int. Cl.
  *G06N 3/08*   (2006.01)
  *G06N 20/00*  (2019.01)
  *G06N 3/04*   (2006.01)
  *G06N 3/082*  (2023.01)

(52) U.S. Cl.
  CPC .......... *G06N 3/082* (2013.01); *G06N 3/0454* (2013.01); *G06N 20/00* (2019.01)

(58) Field of Classification Search
  None
  See application file for complete search history.

(56) References Cited

U.S. PATENT DOCUMENTS

| | | | |
|---|---|---|---|
| 2017/0286830 A1* | 10/2017 | El-Yaniv | G06N 3/0481 |
| 2018/0046906 A1 | 2/2018 | Dally et al. | |
| 2018/0211128 A1* | 7/2018 | Hotson | G06V 20/00 |
| 2019/0050717 A1 | 2/2019 | Temam et al. | |
| 2019/0138882 A1* | 5/2019 | Choi | G06N 3/082 |
| 2019/0347554 A1* | 11/2019 | Choi | G06N 3/04 |

FOREIGN PATENT DOCUMENTS

WO   9614616 A1   5/1996

OTHER PUBLICATIONS

Yosinski et al. "How transferable are features in deep neural networks?" Nov. 6, 2014. arXiv:1411.1792v1. https://arxiv.org/abs/1411.1792 (Year: 2014).*
Rebuffi et al. "Learning multiple visual domains with residual adapters." Nov. 27, 2017. arXiv: 1705.08045v5. https://arxiv.org/abs/1705.08045v5 (Year: 2017).*
Rebuffi et al. "Efficient parametrization of multi-domain deep neural networks." Mar. 27, 2018. arXiv:1803.10082. https://arxiv.org/abs/1803.10082v1 (Year: 2018).*

(Continued)

*Primary Examiner* — Abdullah Al Kawsar
*Assistant Examiner* — Asher H. Jablon
(74) *Attorney, Agent, or Firm* — Leveque Intellectual Property Law, P.C.

(57) ABSTRACT

A system, an apparatus and methods for utilizing software and hardware portions of a neural network to fix, or hardwire, certain portions, while modifying other portions are provided. A first set of weights for layers of the first neural network are established, and selected weights are modified to generate a second set of weights, based on a second dataset. The second set of weights is then used to train a second neural network.

17 Claims, 6 Drawing Sheets

(56) References Cited

OTHER PUBLICATIONS

Ji et al, "Exploring Kernel Based Spatial Context for CNN Based Hyperspectral Image Classification," 2017 International Conference on Digital Image Computing: Techniques and Applications (DICTA), 2017, pp. 1-7 (Year: 2017).*

Saha et al. "Efficient deep learning model for mitosis detection using breast histopathology images." Computerized Medical Imaging and Graphics 64 (Mar. 2018): 29-40. (Year: 2018).*

Jason Yosinski, Jeff Clune, Yoshua Bengio, Hod Lipson, "How transferable are features in deep neural networks?," Proceedings of the 27th International Conference on Neural Information Processing Systems—vol. 2, Montreal, Canada, p. 3320-3328, 2014, MIT Press (Included on IDS filed Jan. 8, 2021) (Year: 2014).*

Yosinski et al., "How transferable are features in deep neural networks?", 2014, arXiv:1411,1792v1 [cs.LG] (Year: 2014).*

O'Shea et al., "An Introduction to Convolutional Neural Networks," 2015, arXiv:1511.08458v2 [cs.NE] (Year: 2015).*

Han et al., "Deep Compression: Compressing Deep Neural Networks with Pruning, Trained Quantization and Huffman Coding," 2016, arXiv:1510.00149v5 [cs.CV] (Year: 2015).*

Wen et al., "Latent Factor Guided Convolutional Neural Networks for Age-Invariant Face Recognition," 2016 IEEE Conference on Computer Vision and Pattern Recognition (CVPR), 2016, pp. 4893-4901 (Year: 2016).*

Sarwar et al., "Gabor filter assisted energy efficient fast learning Convolutional Neural Networks," 2017 IEEE/ACM International Symposium on Low Power Electronics and Design (ISLPED), 2017, pp. 1-6 (Year: 2017).*

Rusu et al., "Progressive Neural Networks", 2016, arXiv: 1606.04671v3 [cs.LG], 14 pages (Year: 2016).*

Zagoruyko et al., "Wide Residual Networks", 2017, arXiv: 1605.07146v4 [cs.CV], 15 pages (Year: 2017).*

Tautkute et al., "DeepStyle: Multimodal Search Engine for Fashion and Interior Design", 2018, arXiv preprint arXiv:1801.03002v1, 11 pages (Year: 2018).*

Pete Warden, "Why GEMM is at the Heart of Deep Learning," https://petewarden.com/2015/04/20/why-gemm-is-at-the-heart-of-deep-learning/, Apr. 20, 2015.

Y. H. Chen, J. Emer and V. Sze, "Eyeriss: A Spatial Architecture for Energy-Efficient Dataflow for Convolutional Neural Networks," 2016 ACM/IEEE 43rd Annual International Symposium on Computer Architecture (ISCA), Seoul, 2016, pp. 367-379.

Jouppi et al., "In-Datacenter Performance Analysis of a Tensor Processing Unit," 44th International Symposium on Computer Architecture (ISCA), Toronto, Canada, Jun. 24-28, 2017.

B. Moons and M. Verhelst, "A 0.3-2.6 TOPS/W precision-scalable processor for real-time large-scale ConvNets," 2016 IEEE Symposium on VLSI Circuits (VLSI-Circuits), Honolulu, HI, 2016, pp. 1-2.

Parashar et al., "SCNN: An Accelerator for Compressed-sparse Convolutional Neural Networks," ISCA '17 Proceedings of the 44th Annual International Symposium on Computer Architecture, Toronto, ON, Canada — Jun. 24-28, 2017, pp. 27-40.

Yosinski et al., "How transferable are features in deep neural networks?," Advances in Neural Information Processing Systems 27, pp. 3320-3328 Dec. 2014.

Dongyoung Kim, Junwhan Ahn, and Sungjoo Yoo. 2017. A novel zero weight/activation-aware hardware architecture of convolutional neural network. In Proceedings of the Conference on Design, Automation & Test in Europe (DATE 17). European Design and Automation Association, 3001 Leuven, Belgium, Belgium, 1466-1471.

Jason Yosinski, Jeff Clune, Yoshua Bengio, Hod Lipson, "How transferable are features in deep neural networks?," Proceedings of the 27th International Conference on Neural Information Processing Systems—vol. 2, Montreal, Canada, p. 3320-3328, 2014, MIT Press.

Sarwar, Syed & Ankit, Aayush & Roy, Kaushik (2017) Incremental Learning in Deep Convolutional Neural Networks Using Partial Network Sharing.

Dongyoung et al., "A novel zero weight/activation-aware hardware architecture of convolutional neural network," Proceedings of the Conference on Design, Automation & Test in Europe, European Design and Automation Association, Lausanne, Switzerland, 1466-1471, Mar. 27-31, 2017.

Sarwar et al., "Incremental Learning in Deep Convolutional Neural Networks Using Partial Network Sharing," arXiv:1712.02719v4 [cs.CV], Dec. 7, 2017.

* cited by examiner

SYSTEM, METHOD AND APPARATUS FOR TRAINING NEURAL NETWORKS USING MULTIPLE DATASETS

BACKGROUND

Machine learning technology is continually evolving and has come to support many aspects of modern society, from web searches, content filtering, automated recommendations on merchant websites, automated game playing, to object detection, image classification, speech recognition, machine translations, and drug discovery and genomics.

The first, and most important stage in machine learning is training. For example, a machine learning system for the classification of images typically includes a large data set of images e.g., people, pets, cars, and houses, that has been collected and labeled with a corresponding category. During training, the machine is shown an image and produces an output in the form of a vector of scores, one for each category. The objective is for the correct category to have the highest score of all categories.

BRIEF DESCRIPTION OF THE DRAWINGS

The accompanying drawings provide visual representations, which will be used to more fully describe various representative embodiments and can be used by those skilled in the art to better understand the representative embodiments disclosed and their inherent advantages. In these drawings, like reference numerals identify corresponding elements.

DETAILED DESCRIPTION

Figure 1:
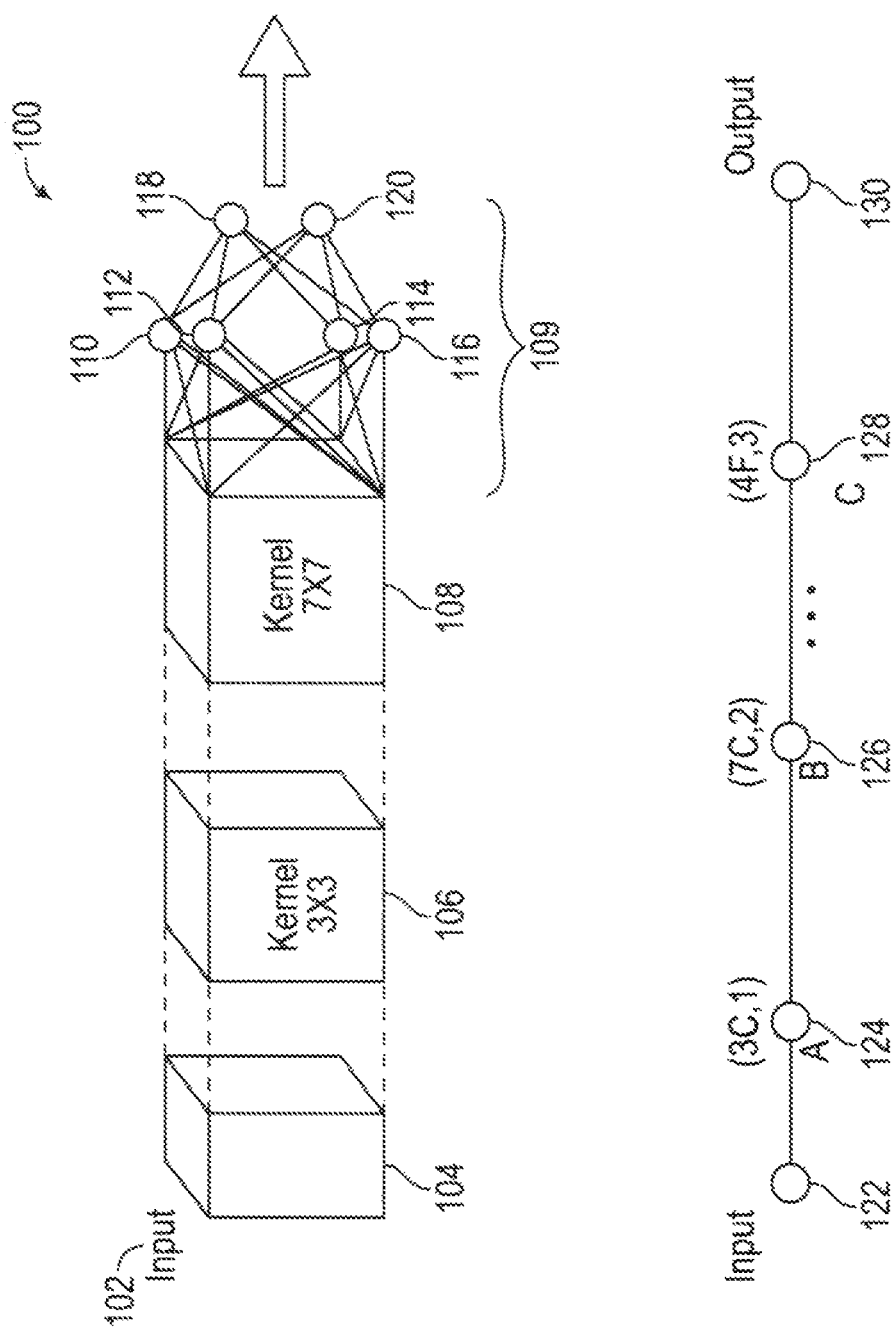
FIG. 1 illustrates a neural network.

While this disclosure is susceptible of embodiment in many different forms, there is shown in the drawings and will herein be described in detail specific embodiments, with the understanding that the present disclosure is to be considered as an example of the principles described and not intended to limit the disclosure to the specific embodiments shown and described. In the description below, like reference numerals are used to describe the same, similar or corresponding parts in the several views of the drawings.

In this document, relational terms such as first and second, top and bottom, and the like may be used solely to distinguish one entity or action from another entity or action without necessarily requiring or implying any actual such relationship or order between such entities or actions. The terms "comprise", "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Reference throughout this document to "one embodiment", "certain embodiments", "an embodiment" or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C". An exception to this definition will occur only when a combination of elements, functions, operations or acts are in some way inherently mutually exclusive.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

A "module" as used herein describes a component or part of a program or device that can contain hardware or software, or a combination of hardware and software. In a module that includes software, the software may contain one or more routines, or subroutines. One or more modules can make up a program and/or device.

Neural networks (NNs) are of interest in many fields, including science, commerce, medicine and industry since the networks can be given datasets where it is not known what relationships are inherent within the data and the NN can learn how to classify the data successfully. A NN is a combination of neurons that are connected together in varying configurations to form a network. The basic structure of a 2-input NN includes two input neurons disposed in a first or input layer. Each input neuron presents its output to three neurons disposed in a hidden layer. Hidden layer neurons in each present their output to a single neuron disposed in an output layer.

Neural networks find relationships within data, allowing the data to be classified, and then successfully classify input vectors, or patterns, that the NN was not exposed to during training. This powerful property is often referred to as the NNs' ability to "generalize". The input vectors that the NN was not exposed to during training are commonly referred to as unseen patterns or unseen input vectors. For NNs to be able to generalize they require training.

Thus, neural networks may comprise a set of layers, the first layer being an input layer configured to receive an input. The input layer includes neurons that are connected to neurons in a second layer, which may be referred to as a hidden layer. Neurons of the hidden layer may be connected to a further hidden layer, or an output layer.

In some neural networks, each neuron of a layer has a connection to each neuron in a following layer. Such neural networks are known as fully connected (FC) networks. The training data is used to let each connection to assume a weight that characterizes a strength of the connection. Some neural networks comprise both fully connected layers and layers that are not fully connected. Fully connected layers in a convolutional neural network may be referred to as densely connected layers.

Convolutional neural networks (CNN), are feed-forward neural networks that comprise layers that are not fully connected. In CNNs, neurons in a convolutional layer are connected to neurons in a subset, or neighborhood, of an earlier layer. This enables, in at least some CNNs, retaining spatial features in the input.

In some cases the data may not have been subject to any prior classification, and in these circumstances it is common to use unsupervised training, such as self-organizing maps, to classify the data. In other cases the data may have been previously broken into data samples that have been classified, and in these circumstances it is common to train a NN to be able to classify the additional unclassified data. In the latter case, a supervised learning algorithm is traditionally used. Classified input data examples have an associated output and during training, the NN learns to reproduce the desired output associated with the input vector.

During training a NN learns salient features in the data set it is trained with and can then "predict" the output of unseen input vectors. What the NN can classify depends on what the NN has been trained with.

As discussed earlier, training a NN to learn a data may require a long time to train as it is possible that the NN may never learn a data set. It is accepted that the time it takes to train a fixed-size NN may be exponential. For this reason, how long it takes to train a NN has become a standard of comparison between alternative training algorithms. An ideal training algorithm would require minimal exposure to training input vectors. The minimum possible exposure to training input vectors in the optimal situation would be to expose the NN to each input vector only once to be fully trained.

Most NN training algorithms find single numeric values that attempt to satisfy the training conditions, and learn by iteratively modifying weight values based on the error between the desired output of the NN and the actual output.

Neural networks and related systems can be represented as distributed processing elements that implement summation, multiplication, exponentiation or other functions on the elements incoming messages/signals. Such networks can be enabled and implemented through a variety of implementations. For example, a system may be implemented as a network of electronically coupled functional node components. The functional node components can be logical gates arranged or configured in a processor to perform a specified function. As a second example, the system may be implemented as a network model programmed or configured to be operative on a processor. The network model is preferably electronically stored software that encodes the operation and communication between nodes of the network. Neural networks and related systems may be used in a wide variety of applications and can use a wide variety of data types as input such as images, video, audio, natural language text, analytics data, widely distributed sensor data, or other suitable forms of data.

In particular, convolutional neural networks (CNNs) may be useful for performing inference on data for which feature recognition is independent of one or more dimensions of the data; for example, when detecting shapes in an image, the detected shapes are not dependent on their position in the image—the same features used to detect a square in one part of the image may be used to detect a square in another part of the image as well. These dimensions may be spatial (as in the 2D image example), but may additionally or alternatively be temporal or any suitable dimensions (e.g., a frequency dimension for audio or multispectral light data).

Neural networks are used to map or classify a set of input patterns to a set of output patterns. Systems based on neural networks have evolved as a popular machine learning basis, and have been successfully employed in a wide variety of domains for practical applications. As would be understood, for classifying the input patterns with adequate correctness, the neural networks first need to do undergo a learning exercise which is called the training phase. During the training phase, paired training samples for example depicted as (x, y), of an input x and a corresponding output or label y, are provided to the neural network, which then learns or establishes how to associate or map the given input x with the correct output y.

FIG. 1 shows a neural network 100. The neural network 100 includes a plurality of layers connecting an input 102/104 to an output 130. While any number of component networks of any complexity can be employed, for the purposes of the present disclosure, a relatively simple neural network 100 is shown. In the case of neural network 100, there is an input image 104 and two convolution layers 106 (3×3 kernels) and 108 (7×7 kernels) that are applied before a fully connected layer 109 that provides a final output. The connected layer 109 includes interconnected nodes 110, 112, 114, 116 that are connected to nodes 118 and 120.

Nodes 118 and 120 are produced by contracting the vertices to provide a simpler optimized graph with fewer nodes and all nodes with the same identifier label are merged and any parallel edges are removed.

Also shown in FIG. 1, input 122 is coupled to identifier labels A, B . . . C that have been applied to nodes 124, 126, 128, respectively, having coordinates (3C,1), (7C,2) . . . (4F,3), respectively.

Each node A (124), B (126), C (128) is provided with a structure label based on the properties of the corresponding layer in the original component network.

In FIG. 1, "C" stands for convolutional and "F" stands for fully connected. Node A 124, with "3C" means a convolutional layer with kernel size 3×3. The second property of each layer is its distance from its input in the graph. Thus, the node A 124 (3C, 1) means a convolutional layer with a 3×3 having a distance 1 from the input node.

The neural network layers tend to look similar for tasks in related domains, e.g., image classification, especially near the front of the network. It is an embodiment of the disclosure to split the neural network into two parts, and "hard-code" the weights of some parts, typically to lower the power consumption of executing these workloads. Other parts can remain programmable. An optional cheap programmable part in parallel with the fixed component allows for fine-tuning the fixed part to suit new tasks. The hard-coding of a network layer applies to any layer of the network, regardless of whether the layer is a CNN layer, FC layer or other type of layer. Any layer may be fully hard-coded or partially hardcoded.

Neural networks (NNs) are currently an increasingly popular way to solve a range of challenging classification and regression problems. However, NN inference demands large compute and memory resources and therefore is challenging for power-constrained, battery powered devices. Dedicated hardware accelerators can help close the gap, but NNs are still challenging to use within a mobile power budget.

Figure 2:
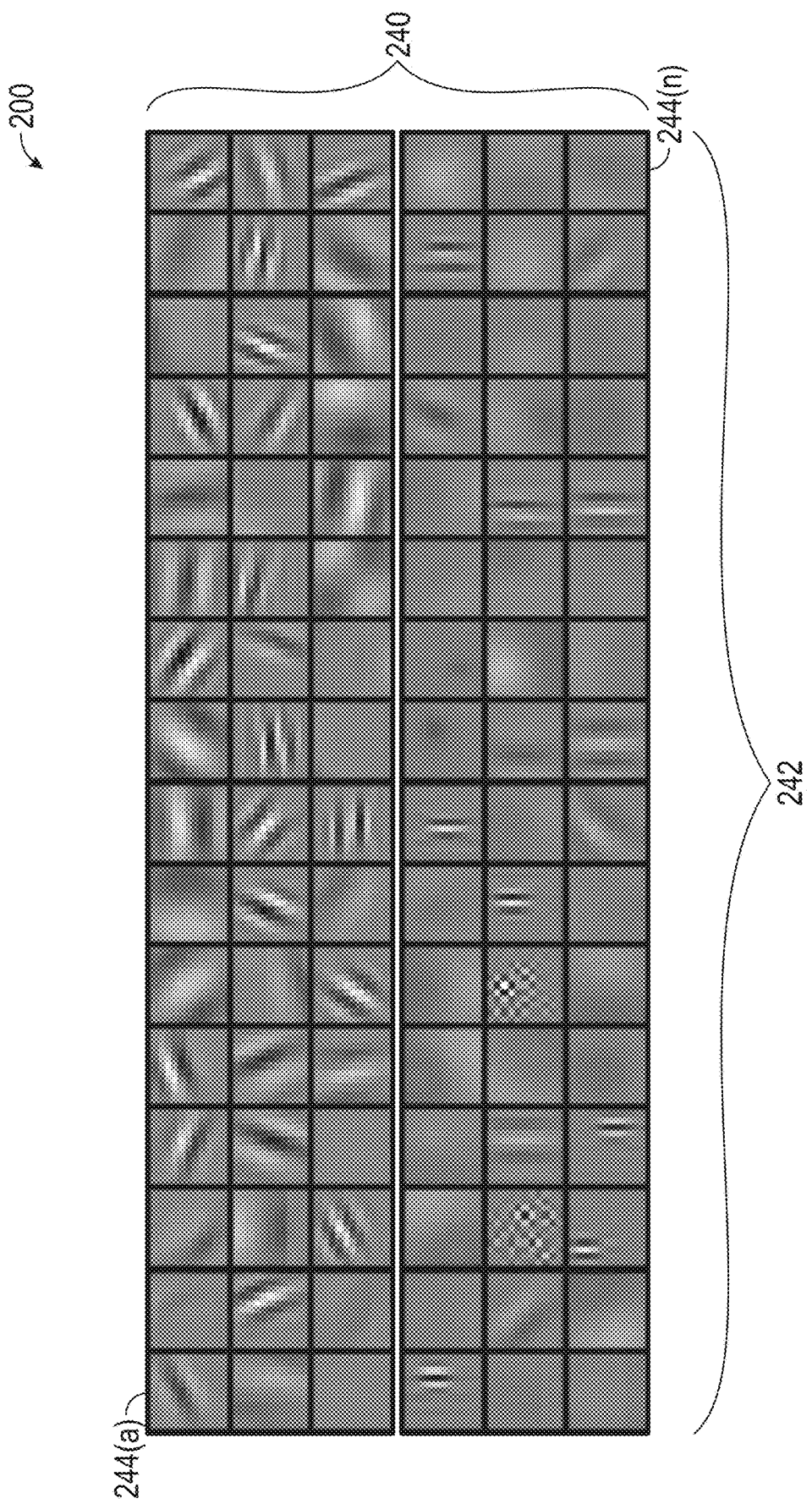
FIG. 2 illustrates first layer weights in a visual image classification convolutional neural network.

An interesting aspect of NNs is that the weights learned for different datasets often have many similarities, especially in the same domain. For example, in visual image classification problems, the first convolutional layers typically resemble Gabor filters and color blobs, as shown in FIG. 2, elements 244 (a) . . . (n), where "n" is any suitable number for image 200 having dimensions 240 and 242. Exploiting this observation, transfer learning relates to the ability to use a set of NN weights trained on a first dataset (i.e., dataset A), for solving a problem on a second dataset (i.e., dataset B). In practice, transfer learning is often exploited in the case where there is not sufficient data to train a new network from scratch. In this case, it is an embodiment of this disclosure to start from a network trained on the first dataset A, and perform a "fine-tuning" operation to update weights in some or all of the layers using a second dataset B. This embodiment is optimized when the two datasets (dataset A and dataset B) are related.

In transfer learning, the most common approach is actually to reuse the convolutional layers from a network trained on similar data, and update the fully-connected layers using the new dataset. In this case, the weights for the "hardwired" layers are fixed during the fine-tuning operation. This has an advantage that the hard-wired layers (at least the earlier layers) can be used to provide lower-level features that will typically be useful for other tasks in related domains.

This disclosure describes efficient implementation of domain-specific feature generators in fixed hardware, which can be used by a variety of different NN tasks in the transfer learning style. Since the hardware is fixed, rather than having programmable weights, it has power and performance advantages. Also described are techniques to provide fine-tuning, which increases the usefulness of the fixed feature generators for dissimilar tasks.

There are a number of ways of fixing parts of an NN in a hardware accelerator for the purpose of increasing power efficiency. These may include fixing, or updating, or modifying: the network architecture (structure); and/or kernels/filters; and/or layers; and/or whole network in hardware.

The hardcoding of layers, or partial hardcoding of layers, as described herein, may be applied to any suitable network layer that is amenable to being hardcoded, either fully or partially. These network layers include CNN layers, FC layers, or any other layer in any type of neural network.

The embodiments described herein apply to hard-coding any layer, or any portion of any layer. Thus, CNN. FC and any other neural layer types could be hard coded, either fully or partially. For example, a pre-trained CNN Alexnet™ uses 3 FC layers at the end of the network. The first two of the three FC layers could be hardcoded and the third (final) layer could be re-trained via transfer learning.

Figure 3:
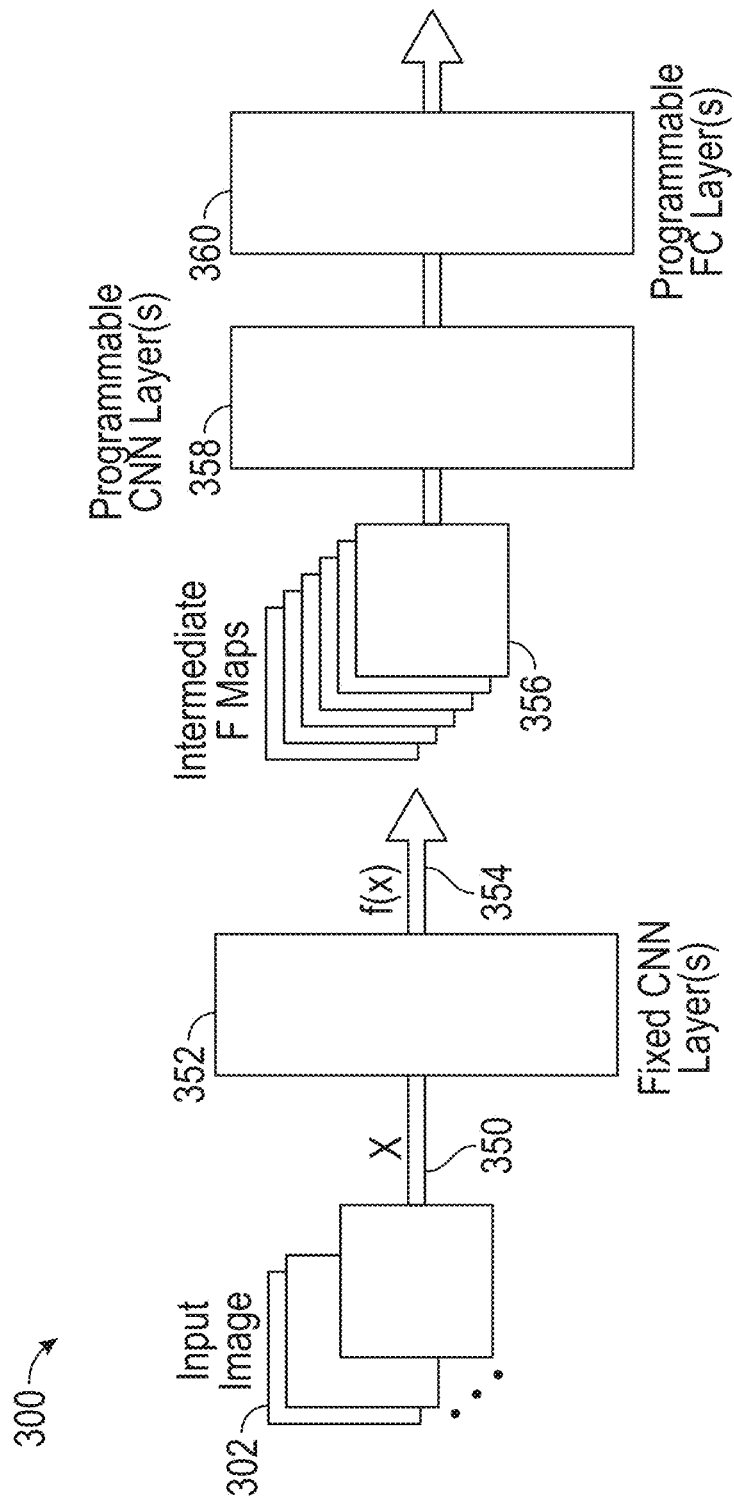
FIG. 3 illustrates a hardware accelerator for neural networks.

FIG. 3 shows a system 300 of a neural network. FIG. 3 includes an input image 302, interface connection 350, one or more fixed layers 352, which is shown as one or more CNN layers, function f(x) 354, intermediate F maps 356, a first set of one or more programmable layer(s) 358, which is shown as CNN layers, and a second set of one or more programmable layers 360, which are shown as FC layers. The layers, as shown in FIG. 3, may be any suitable type of network layer(s) and the illustration of the CNN and FC layers is only one embodiment and other types of layer(s) may be used to achieve the result described herein.

NN architectures are commonly encountered in image classification tasks, without loss of generality. FIG. 3 is an example of the concept of fixing layers in hardware. The three main hardware components: 1.) a set of fixed, or established, CNN layers shown as element 352; 2.) a set of programmable CNN layers, shown as element 358; and 3.) a set of programmable fully-connected (FC) layers, shown as element 360.

The fixed, or established, or set, layers 352 have much greater power efficiency and performance than their programmable counterpart. The weights in the fixed part are chosen at design time to suit a certain application domain, such as visual image classification tasks. The more fixed layers 352 provided in the hardware, the higher the energy efficiency, but the generalization performance will eventually degrade due to task specificity. For some ubiquitous applications, it may be desirable to fix all the layers to generate a single task fixed hardware accelerator.

There is a significant PPA advantage for fixed NN layers. Since there is no storage requirement for the weights in these layers, there is no associated DRAM, SRAM and register power consumption for weights in these layers. Instead the weights are entirely encoded as fixed scalers in the datapath. These fixed scalers are significantly smaller and lower power than a full programmable multiplier, with the multiplicand supplied from a pipeline register. As an example, when comparing the number of MACs per Watt for programmable ("var 8b") and fixed ("fix 8b") datapaths, the input operand width is 8-bit and the accumulator is 32-bit wide. The process technology is TSMC 16 nm and the clock frequency is 1 GHz. Depending on the width of the datapath, the power efficiency advantage is about 2×-6× for a fixed datapath.

Beyond the fundamental hardware savings, there are also a number of other optimizations that are unlocked only for fixed layers. Techniques such as quantization, pruning small weights and sharing common sub-expressions, can all be used to a much greater extent than with programmable weights, since each individual weight can be optimized as required, rather than having to optimize for the worst case requirements of all weights. Fully exploiting these additional optimizations leads to even greater gains.

Obviously, fixing, or establishing, or setting, one or more NN layers means that said layer(s) cannot be changed over time. This may become a limitation as NN applications change over time. To maximize the utility of the fixed layers for unknown future NN requirements, it may be desirable to provide a hardware mechanism to implement something similar to the fine-tuning operation that is used in transfer learning.

Figure 4:
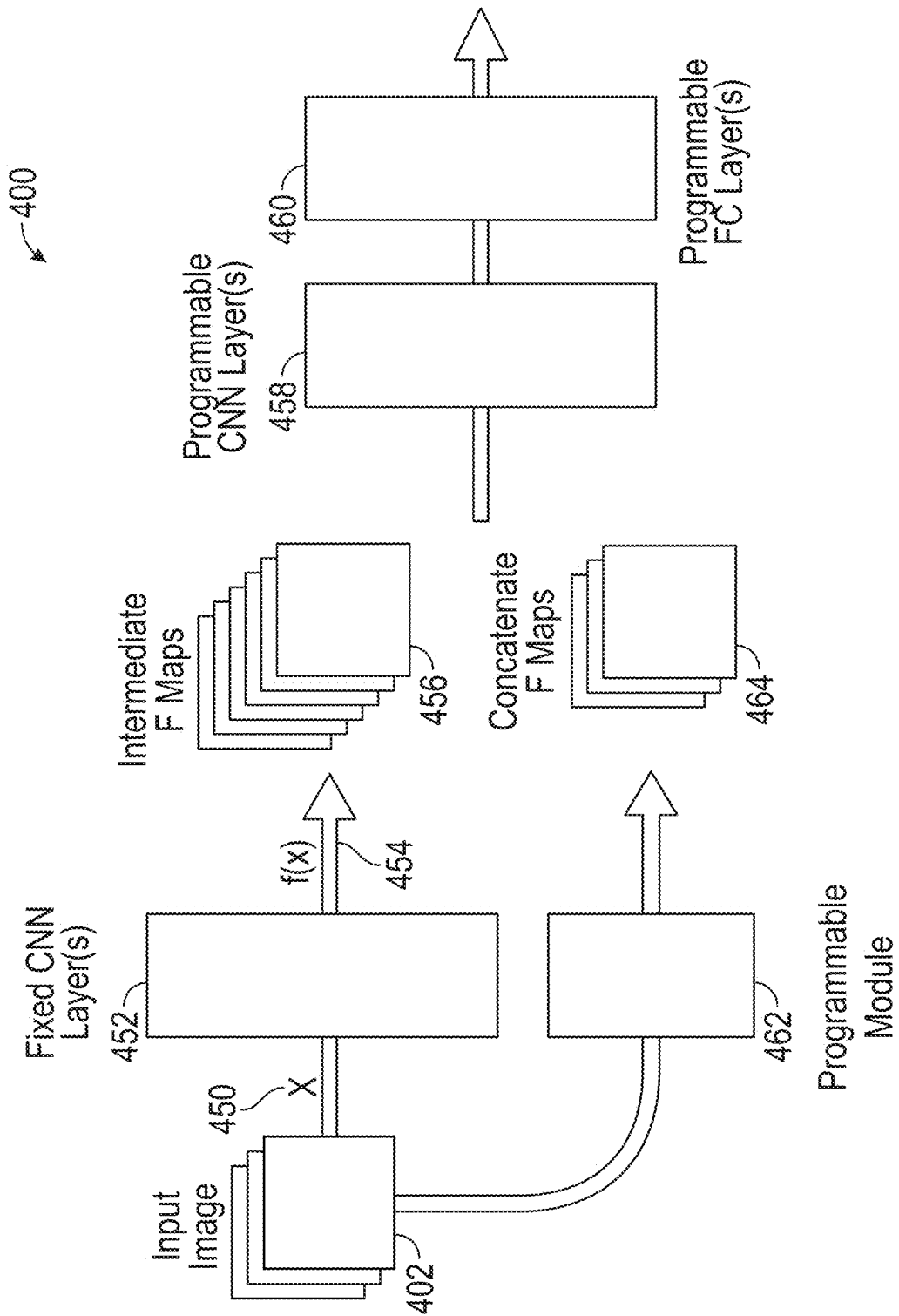
FIG. 4 illustrates a hardware accelerator with a programmable module.

FIG. 4 shows the basic arrangement 400, where there is a small programmable segment 462 that operates in parallel with the fixed layer(s) 452. The output of the programmable segment in the fixed layers is concatenated with the fixed outputs (feature maps). Alternatively, the parallel programmable part 462 can be combined using residual connections, where they would be added to the fixed layer outputs. The weights in the parallel programmable part should preferably be very sparse, such that very little computation or storage overhead is encountered.

Specifically, FIG. 4 shows system 400 that includes an input image 402 that is provided to one or more fixed layer(s) 452, shown as CNN layer(s), via interface 450. Image input 402 is provided to programmable module 462.

Fixed layer(s) 452 generate intermediate F maps 456 as a function of f(x) 454. Programmable module 462 generates concatenate F maps 464. Intermediate F maps 456 and concatenate F maps 464 are provided to programmable layer(s), shown as CNN layer(s) 458, and then to programmable layer(s), shown as FC layer(s) 460.

Figure 5:
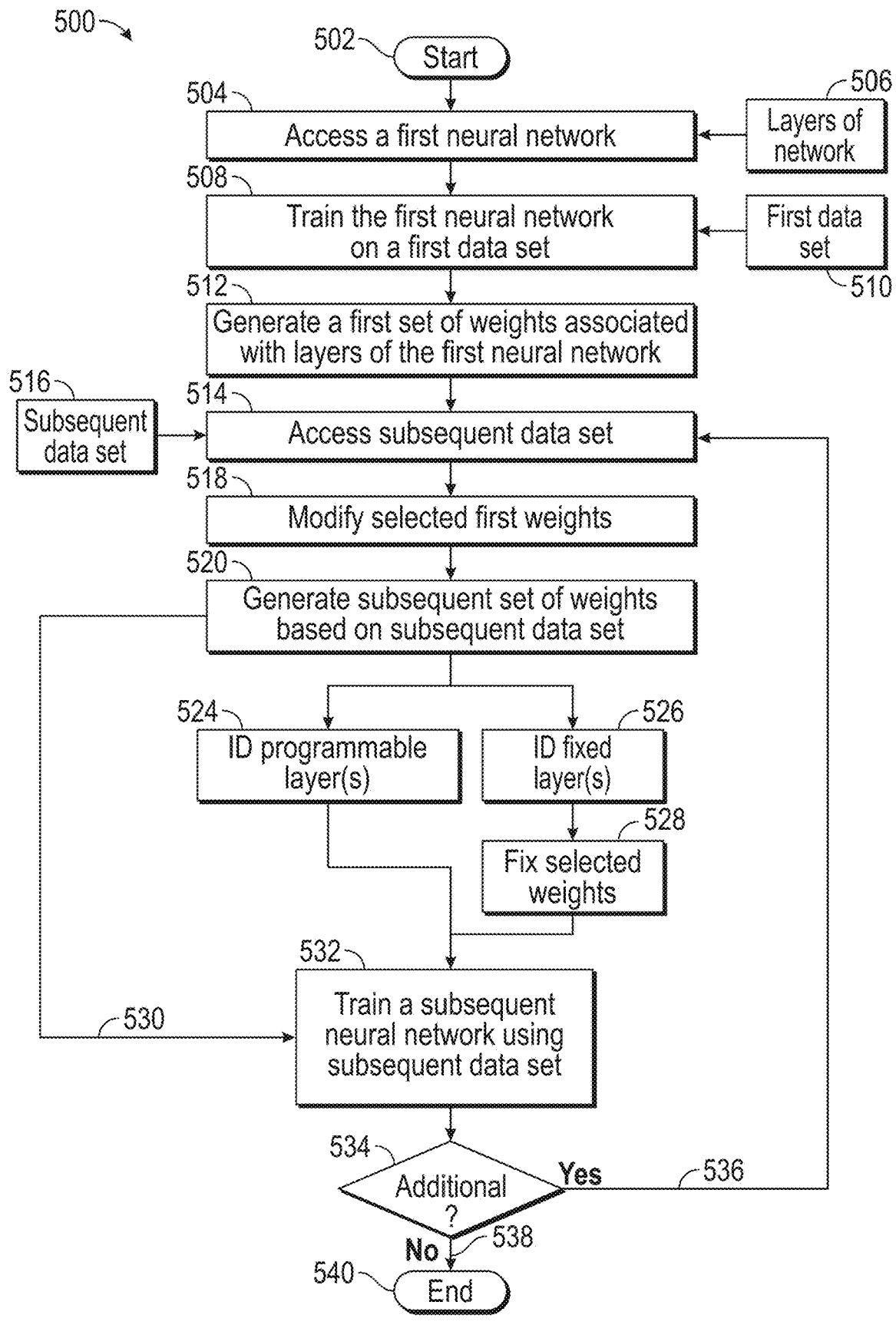
FIG. 5 illustrates a flowchart of according to an embodiment of the disclosure.

FIG. 5 shows a process, flowchart, or algorithm, 500. Flowchart 500 is a diagram that represents an algorithm, workflow or process that may interact with hardware components and modules. The flowchart 500 shows the operations as boxes of various kinds, and their order.

The series of operations 500 may be stored on nonvolatile memory or other suitable memory or computer-usable medium and in any suitable programming language.

Any combination of one or more computer-usable or computer-readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device.

The computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if desired, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer-usable program code may be transmitted using any appropriate medium, including but not limited to wireless, wire line, optical fiber cable, RF, etc.

Computer program code for carrying out operations of the present disclosure may be written in any combination of one or more programming languages, including an object-oriented programming language such as Java, Smalltalk, C++, C# or the like, and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present disclosure is described below with reference to flowchart illustrations and/or block diagrams of methods, apparatus, systems and computer program products according to embodiments of the disclosure. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer, or other programmable data processing apparatus, create means for implementing the functions/acts specified in the flowchart and/or block diagram block or blocks. These computer program instructions may also be stored in a computer-readable medium that can direct a computer or other programmable data processing apparatus, to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operations to be performed on the computer, or other programmable apparatus to produce a computer-implemented process such that the instructions which execute on the computer or other programmable apparatus, provide processes for implementing the functions/acts specified in the flowchart and/or block diagram block or blocks.

As shown in FIG. 5, the algorithm 500 begins (502). A first neural network is accessed (504) and includes various layers (506). These layers (506) may include one or more fixed, or established, or set, layer(s) (FIG. 3, element 352), programmable CNN layer(s) (FIG. 3, element 358), and programmable FC layer(s) (FIG. 3, element 360).

The first neural network is trained on a first dataset (508). The training of the network may be accomplished utilizing a suitable training routine. The first dataset (510) may be accessed from a remote location, or may be local.

A first set of weights is generated (512). The first set of weights is generated by training the first neural network on a first dataset, and particularly, training various layer(s) of the first neural network on the first dataset. The selection of the layer(s) that are trained is based on the characteristics, for example, domain of the layer(s).

A subsequent dataset is accessed (514). The subsequent dataset may be a second dataset, or any number of many datasets. The second, or subsequent, dataset may be accessed (516) from a remote location or a local location, or any suitable location. The use of additional datasets are used to generate subsequent sets of weights, as described herein.

The first set of weights is modified (518). This modification of the first set of weights is typically some of the weights, based on the layer and dataset. While it is envisioned that many of the first weights will be modified, many others of the first set of weights will not be modified. The non-modification of one or more of the first weights is a function of the neural network.

A subsequent set of weights is generated (520). The second set, or any number of subsequent sets, of weights are based on a second dataset, or any number of subsequent datasets. Line 530 shows that a second, or subsequent, neural network is trained using the second, or subsequent, dataset and a second, or subsequent, set of weights (532).

Following generation of a subsequent set of weights being generated (520), two other operations, or functions, may occur. These include identifying programmable layer(s) of a neural network (524), identifying fixed layer(s) (526) and fixing selected weights for one or more fixed layers (528).

The two operations (524) and (526/528) are used to "freeze" some layer(s) of the neural network, while permitting programming of other layer(s) of the neural network. The portion of the frozen layer(s) to the programmable layers(s) depends on the neural network parameters. These alternatives (frozen portion and programmable portion) that while increasing the efficiency and speed of the process, are not demanded by the process.

As stated above, a second, or subsequent, neural network is trained using the subsequent dataset and subsequent weights (532). Thus, the portion of the neural network that is to be fixed, or frozen is "retrained" with an awareness that the fixed portion will be frozen in hardware (examples include quantization of weights, sparsification to remove weights, directing values towards lower hamming-distances from 0 to yield smaller hardcoded multiplication structures in an ASIC, etc.).

A determination is made whether there are additional networks to be trained (534). If so (536) a subsequent dataset is accessed (514). If not (538), the process ends (540).

Figure 6:
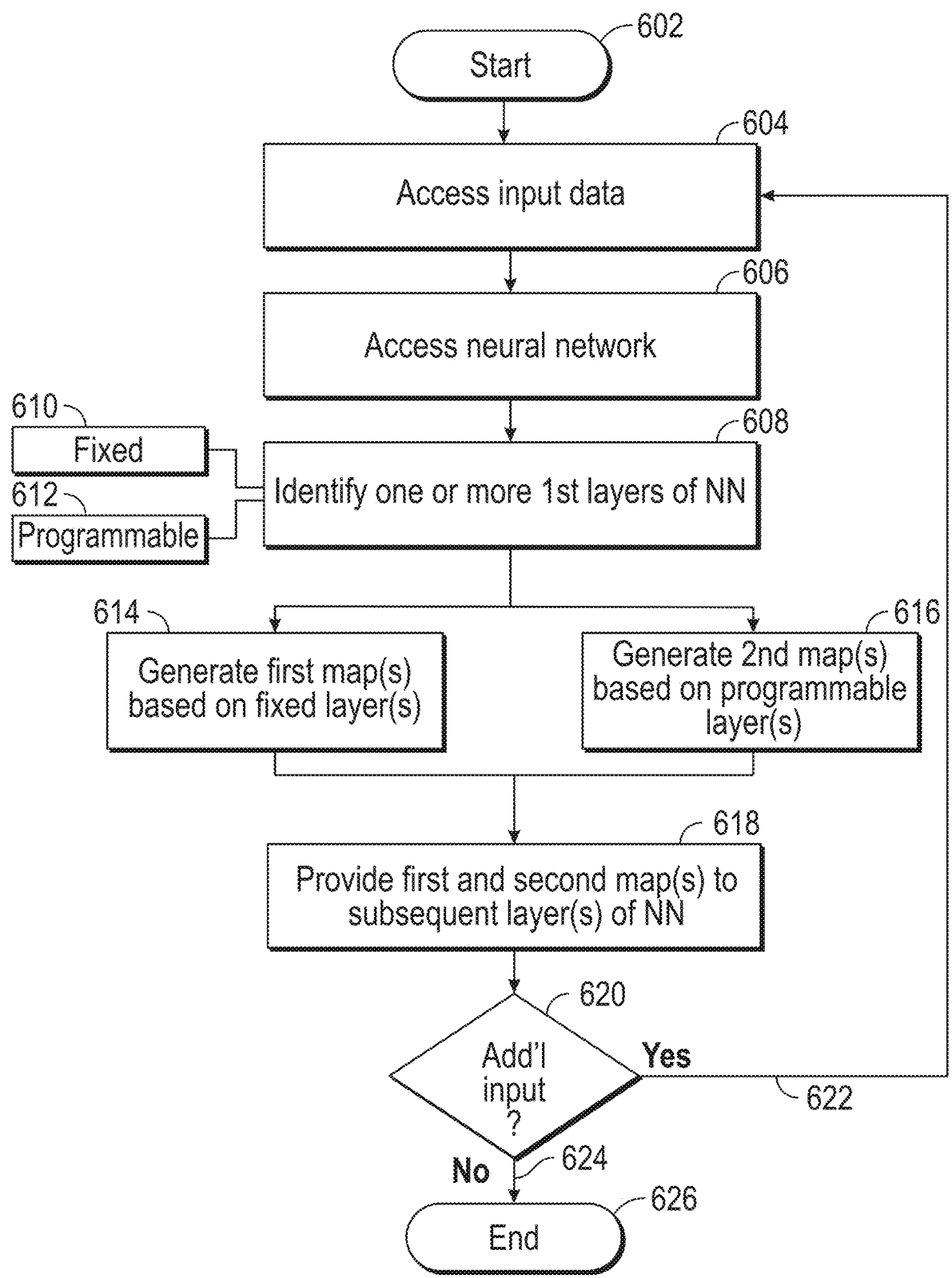
FIG. 6 illustrates a flowchart according to another embodiment of the disclosure.

FIG. 6 shows a process, flowchart, or algorithm, 600. Flowchart 600 is a diagram that represents an algorithm, workflow or process that may interact with hardware components and modules. The flowchart 600 shows the operations as boxes of various kinds, and their order.

As shown in FIG. 6, the algorithm 600 begins (602). Input data is accessed (604). The input data may be image data, voice data or any type of data suitable for processing.

A first neural network is accessed (606) and includes one or more layer(s) (608). These layers may include one or more of fixed, or established, or set, layer(s) (610) and one or more programmable layer(s) (612).

The fixed layer(s) may be hard-wired, or frozen such that these fixed layers are not programmable. The fixed layer(s) of the neural network may be the result of being trained or learning from a one or more other neural network(s). The fixed layer(s) generate a first set of maps, such as intermediate F maps (614). The first maps are generated as a result of the operations of the fixed layer(s).

The programmable layer(s) may be programmed and are not hard-wired as the fixed layer(s) are. The programmable layer(s) generate a second set of maps, such as concatenate F maps (616). The second maps are generated as a result of the operations of the programmable layer(s)

The first map(s), such as intermediate F maps and the second map(s), such as concatenate F maps are provided to subsequent neural network layer(s) (618). These subsequent neural network layers may be programmable layer(s), such as CNN and/or FC layer(s). One embodiment of the disclosure is that the subsequent network layer(s) are programmable layer(s). This permits the fixed, or frozen, portion of the network to be hard-wired in a segment of the network.

A determination is made whether there is additional input data (620). If so (622), the additional input data is accessed (604). If not (624), the algorithm ends (626).

The computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if desired, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer-usable program code may be transmitted using any appropriate medium, including but not limited to wireless, wire line, optical fiber cable, RF, etc.

The present embodiments are described below with reference to flowchart illustrations and/or block diagrams of methods, apparatus, systems and computer program products according to embodiments. It will be understood that each block of the flowchart illustrations and/or block diagrams, and combinations of blocks in the flowchart illustrations and/or block diagrams, can be implemented by computer program instructions.

Unless stated otherwise, terms such as "first" and "second" are used to arbitrarily distinguish between the elements such terms describe. Thus, these terms are not necessarily intended to indicate temporal or other prioritization of such elements.

As will be appreciated by one skilled in the art, the disclosure may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the embodiments may take the form of a computer program product embodied in any tangible medium of expression having computer-usable program code embodied in the medium.

It can be seen that the system and methodologies presented herein provide an advancement in the state of the art.

Accordingly, some of the disclosed embodiments are set out in the following.

One embodiment is directed to a method, ("the Method") comprising: accessing a first neural network that has one or more layers; training the first neural network on a first dataset; generating a first set of weights associated with one or more layers of the first neural network, the first set of weights based on the training of the first neural network on the first dataset; accessing a second dataset; modifying selected ones of the first set of weights to generate a second set of weights, based on the second dataset; and utilizing the second set of weights to train a second neural network.

Another embodiment is directed to the Method comprising identifying similarities of the first set of weights and the second set of weights.

Another embodiment is directed to the Method determining that the first dataset is the same domain as the second dataset.

Another embodiment is directed to the Method comprising identifying one or more programmable layers.

Another embodiment is directed to the Method identifying one or more layers in the first neural network; and utilizing the identified one or more layers in the first neural network in the second neural network.

Another embodiment is directed to the Method further comprising updating one or more weights associated with the one or more layers of the first neural network.

Another embodiment is directed to the Method identifying selected layers of the first neural network having particular connectivity properties; and updating the identified selected layers of the first neural network based on the second neural network.

Another embodiment is directed to an apparatus ("the Apparatus") comprising: a first neural network that has one or more layers; a first dataset that is used to train the first neural network; a first set of weights associated with one or more layers of the first neural network, the first set of weights generated based on the training of the first neural network on the first dataset; a second dataset; a second set of weights generated by modifying selected ones of the first set of weights and the second set of weights based on the second dataset; and a second neural network trained based on the second set of weights.

Another embodiment is directed to the Apparatus where the first set of weights and the second set of weights are similar.

Another embodiment is directed to the Apparatus where the first dataset is the same domain as the second dataset.

Another embodiment is directed to the Apparatus where the one or more layers include one or more programmable layers.

Another embodiment is directed to the Apparatus where the one or more layers include one or more layers in the first neural that are used in the second neural network.

Another embodiment is directed to the Apparatus comprising one or more weights associated with the one or more layers of the first neural network.

Another embodiment is directed to the Apparatus where selected layers of the first neural network have particular connectivity properties.

Another embodiment is directed to a system ("the System") comprising: a memory; and a processor, coupled to the memory, that executes instructions stored in the memory, the instructions comprising: accessing a first neural network that has one or more layers; training the first neural network on a first dataset; generating a first set of weights associated with one or more layers of the first neural network, the first set of weights based on the training of the first neural network on the first dataset; accessing a second dataset; modifying selected ones of the first set of weights to generate a second set of weights, based on the second dataset; and utilizing the second set of weights to train a second neural network.

Another embodiment is directed to the System where the instructions further comprise identifying similarities of the first set of weights and the second set of weights.

Another embodiment is directed to the System where the instructions further comprise determining that the first dataset is the same domain as the second dataset.

Another embodiment is directed to the System where the instructions further comprise identifying one or more programmable layers.

Another embodiment is directed to the System where the instructions further comprise: identifying one or more layers in the first neural network; and utilizing the identified one or more layers in the first neural network in the second neural network.

Another embodiment is directed to the System where the instructions further comprise updating one or more weights associated with the one or more layers of the first neural network.

Another embodiment is directed to a method comprising: accessing input data; accessing a neural network; identifying one or more first layers of the neural network; parsing the one or more first layers of the neural network into a fixed portion and a programmable portion; generating one or more first maps as a function of the input data and the fixed portion of the one or more first layers of the neural network; generating one or more second maps as a function of the input data and the programmable portion of the one or more first layers of the neural network; utilizing the one or more first maps and the one or more second maps with subsequent layers of the neural network.

The various representative embodiments, which have been described in detail herein, have been presented by way of example and not by way of limitation. It will be understood by those skilled in the art that various changes may be made in the form and details of the described embodiments resulting in equivalent embodiments that remain within the scope of the appended claims.

The invention claimed is:

1. A method, comprising:
at a training computer:
training a neural network on a first dataset to generate an initial set of weights, the neural network including a plurality of layers including at least a first layer, a second layer and a third layer, the first layer including a fixed convolutional layer portion and a programmable convolution layer portion arranged in parallel, the fixed layer portion having an initial fixed set of weights, the programmable layer portion having an initial programmable set of weights, the second layer including a programmable convolutional layer, and the third layer including at least one programmable fully-connected layer;
training, using the initial programmable set of weights and the initial fixed set of weights, the neural network on a second dataset to generate a final programmable set of weights;
identifying the fixed convolutional layer portion and the programmable convolutional layer portion during training;
generating, after generation of the final programmable set of weights, a final fixed set of weights including at least one of:
quantizing at least a portion of the initial fixed set of weights, and
pruning at least a portion of the initial fixed set of weights;
at an inference computer:
processing, using the fixed layer portion of the first layer of the neural network, unprocessed input data to generate first feature map data;
processing, using the programmable layer portion of the first layer of the neural network, the unprocessed input data to generate second feature map data;
processing, using the second layer of the neural network, the first feature map data and the second feature map data to generate output feature map data, including:
concatenating the first feature map data and the second feature map data to generate input feature map data, and
inputting the input feature map data to the programmable convolutional layer of the second layer to generate the output feature map data;
processing, using the third layer of the neural network, the output feature map data to generate output data; and
outputting the output data.

2. The method as claimed in claim 1, further comprising identifying similarities of the initial programmable set of weights and the final programmable set of weights.

3. The method as claimed in claim 1, further comprising determining that the first dataset is the same domain as the second dataset.

4. The method as claimed in claim 1, where the neural network is a convolutional neural network (CNN).

5. The method as claimed in claim 1, further comprising:
identifying selected layers of the neural network having particular connectivity properties; and
updating the identified selected layers of the neural network.

6. The method as claimed in claim 1, where the training computer and the inference computer are the same computer.

7. The method as claimed in claim 1, where the final programmable set of weights in the programmable convolutional layer portion of the first layer are sparse.

8. An apparatus, comprising:
a memory; and
a processor, coupled to the memory, configured to:
read, from the memory, a convolutional neural network including at least a first layer, a second layer and a third layer, the first layer including a fixed convolutional layer portion and a programmable convolution layer portion arranged in parallel, the fixed convolutional layer portion configured to receive unprocessed input data and generate first feature maps and the programmable convolutional layer portion configured to receive unprocessed input data and generate second feature maps, the second layer, including a programmable convolutional layer, configured to receive the first feature maps and the second feature maps and generate one or more output feature maps, the third layer, including at least one programmable fully-connected layer, configured to receive the output feature maps and generate output data,
process, using the first layer of the neural network, the unprocessed input data to generate the first feature maps and the second feature maps,
process, using the second layer of the neural network, the first feature maps and the second feature maps to generate the output feature maps, including:
concatenate the first feature maps and the second feature maps to generate input feature maps, and
input the input feature maps to the programmable convolutional layer of the second layer to generate the output feature maps,
process, using the third layer of the neural network, the output feature maps to generate the output data, and
output the output data,
where the neural network is:
trained on a first dataset to generate an initial set of weights of the first layer, the fixed convolutional layer portion of the first layer having an initial fixed set of weights, the programmable convolutional layer portion of the first layer having an initial programmable set of weights, the fixed convolutional layer portion and the programmable convolutional layer portion being identified during training, and
trained, using the initial programmable set of weights and the initial fixed set of weights, on a second dataset to generate a final programmable set of weights and generate, after generation of the final programmable set of weights, a final fixed set of weights of the fixed convolutional layer portion of the first layer, the final fixed set of weights including at least one of quantizing at least a portion of the initial fixed set of weights, and pruning at least a portion of the initial fixed set of weights.

9. The apparatus as claimed in claim 8, where selected layers of the convolutional neural network have particular connectivity properties.

10. The apparatus as claimed in claim 8, where the final programmable set of weights in the programmable convolutional layer portion of the first layer are sparse.

11. The apparatus as claimed in claim 8, where the final fixed set of weights are hard-wired.

12. A system, comprising:
a training computer including a memory and a processor, coupled to the memory, that executes instructions stored in the memory, the instructions comprising:
training a neural network on a first dataset to generate an initial set of weights, the neural network including a plurality of layers including at least a first layer, a second layer and a third layer, the first layer including a fixed convolutional layer portion and a programmable convolution layer portion arranged in parallel, the fixed layer portion having an initial fixed set of weights, the programmable layer portion having an initial programmable set of weights, the second layer including a programmable convolutional layer, and the third layer including at least one programmable fully-connected layer;
training, using the initial programmable set of weights and the initial fixed set of weights, the neural network on a second dataset to generate a final programmable set of weights;
identifying the fixed convolutional layer portion and the programmable convolutional layer portion during training;
generating, after generation of the final programmable set of weights, a final fixed set of weights including at least one of:
quantizing at least a portion of the initial fixed set of weights, and
pruning at least a portion of the initial fixed set of weights;
an inference computer including a memory and a processor, coupled to the memory, that executes instructions stored in the memory, the instructions comprising:
processing, using the fixed layer portion of the first layer of the neural network, unprocessed input data to generate first feature map data;
processing, using the programmable layer portion of the first layer of the neural network, the unprocessed input data to generate second feature map data;
processing, using the second layer of the neural network, the first feature map data and the second feature map data to generate output feature map data, including:
concatenating the first feature map data and the second feature map data to generate input feature map data, and
inputting the input feature map data to the programmable convolutional layer of the second layer to generate the output feature map data;
processing, using the third layer of the neural network, the output feature map data to generate output data; and
outputting the output data.

13. The system as claimed in claim 12, where the training computer instructions further comprise identifying similarities of the initial programmable set of weights and the final programmable set of weights.

14. The system as claimed in claim 12, where the training computer instructions further comprise determining that the first dataset is the same domain as the second dataset.

15. The system as claimed in claim 12, where the training computer and the inference computer are the same computer.

16. The system as claimed in claim 12, where the final programmable set of weights in the programmable convolutional layer portion of the first layer are sparse.

17. The system as claimed in claim 12, where the unprocessed input data is an image or a voice.

\* \* \* \* \*